(12) United States Patent
Fukuta et al.

(10) Patent No.: US 11,470,494 B2
(45) Date of Patent: Oct. 11, 2022

(54) USER EQUIPMENT

(71) Applicant: KYOCERA Corporation, Kyoto (JP)

(72) Inventors: Noriyoshi Fukuta, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 108 days.

(21) Appl. No.: 16/991,981

(22) Filed: Aug. 12, 2020

(65) Prior Publication Data

US 2020/0374736 A1 Nov. 26, 2020

Related U.S. Application Data

(63) Continuation of application No. PCT/JP2019/005566, filed on Feb. 15, 2019.
(Continued)

(51) Int. Cl.
*H04W 24/10* (2009.01)
*H04W 16/18* (2009.01)
(Continued)

(52) U.S. Cl.
CPC .......... *H04W 24/10* (2013.01); *H04W 16/18* (2013.01); *H04W 24/08* (2013.01); *H04W 88/06* (2013.01)

(58) Field of Classification Search
None
See application file for complete search history.

(56) References Cited

U.S. PATENT DOCUMENTS

| 9,008,687 | B2 * | 4/2015 | Johansson | ............. | G01S 5/0263 |
| | | | | | 455/456.1 |
| 9,237,468 | B2 * | 1/2016 | Jung | ..................... | H04W 24/08 |

(Continued)

FOREIGN PATENT DOCUMENTS

| JP | 2015-142171 A | 8/2015 |
| JP | 2015-526986 A | 9/2015 |

(Continued)

OTHER PUBLICATIONS

CMCC et al.; "New WID: Bluetooth/WLAN Measurement Collection in MDT"; 3GPP TSG RAN Meeting #78; RP-172820; Dec. 18-21, 2017; pp. 1-4; Lisbon, Portugal.
(Continued)

*Primary Examiner* — Tri H Phan
(74) *Attorney, Agent, or Firm* — Studebaker & Brackett PC

(57) ABSTRACT

A user equipment according to one aspect is a user equipment of a cellular communication system, the user equipment comprising a communicator configured to perform a radio communication by WLAN and/or Bluetooth, a cellular receiver configured to receive a configuration message which is transmitted from a network of the cellular communication system and sets an MDT measurement in which the cellular communication system is set as a measurement target, a controller configured to perform a radio measurement on the cellular communication system based on the configuration message, and a cellular transmitter configured to transmit, to the network, MDT measurement information including a measurement result for the cellular communication system. The controller is configured to include the measurement result for the WLAN and/or the Bluetooth in the MDT measurement information when the measurement result for the WLAN and/or the Bluetooth is available.

7 Claims, 6 Drawing Sheets

Related U.S. Application Data

(60) Provisional application No. 62/630,922, filed on Feb. 15, 2018.

(51) Int. Cl.
*H04W 24/08* (2009.01)
*H04W 88/06* (2009.01)

(56) References Cited

U.S. PATENT DOCUMENTS

| | | | |
|---|---|---|---|
| 9,253,678 B2 * | 2/2016 | Keskitalo | H04W 24/10 |
| 9,264,928 B2 * | 2/2016 | Liu | H04W 24/10 |
| 9,338,740 B2 | 5/2016 | Guo et al. | |
| 9,374,665 B2 * | 6/2016 | Johansson | G01S 5/0263 |
| 9,674,723 B2 * | 6/2017 | Siomina | H04J 3/0685 |
| 9,686,708 B2 | 6/2017 | Fukuta et al. | |
| 10,390,252 B2 * | 8/2019 | Fukuta | H04W 88/06 |
| 10,462,691 B2 * | 10/2019 | Keskitalo | H04W 4/06 |
| 10,521,487 B2 * | 12/2019 | Zhou | G06F 17/00 |
| 2015/0215890 A1 | 7/2015 | Nagatomo | |
| 2016/0080958 A1 * | 3/2016 | Rinne | H04W 24/10 370/338 |
| 2018/0160416 A1 | 6/2018 | Mitsui et al. | |

FOREIGN PATENT DOCUMENTS

| | | |
|---|---|---|
| WO | 2014/157074 A1 | 10/2014 |
| WO | 2016/190254 A1 | 12/2016 |

OTHER PUBLICATIONS

3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimalization of Drive Tests (MDT); Overall Description; 3GPP TS 37.320 V14.0.0; Mar. 2017; pp. 1-7; Release 14; 3GPP Organizational Partners.

* cited by examiner

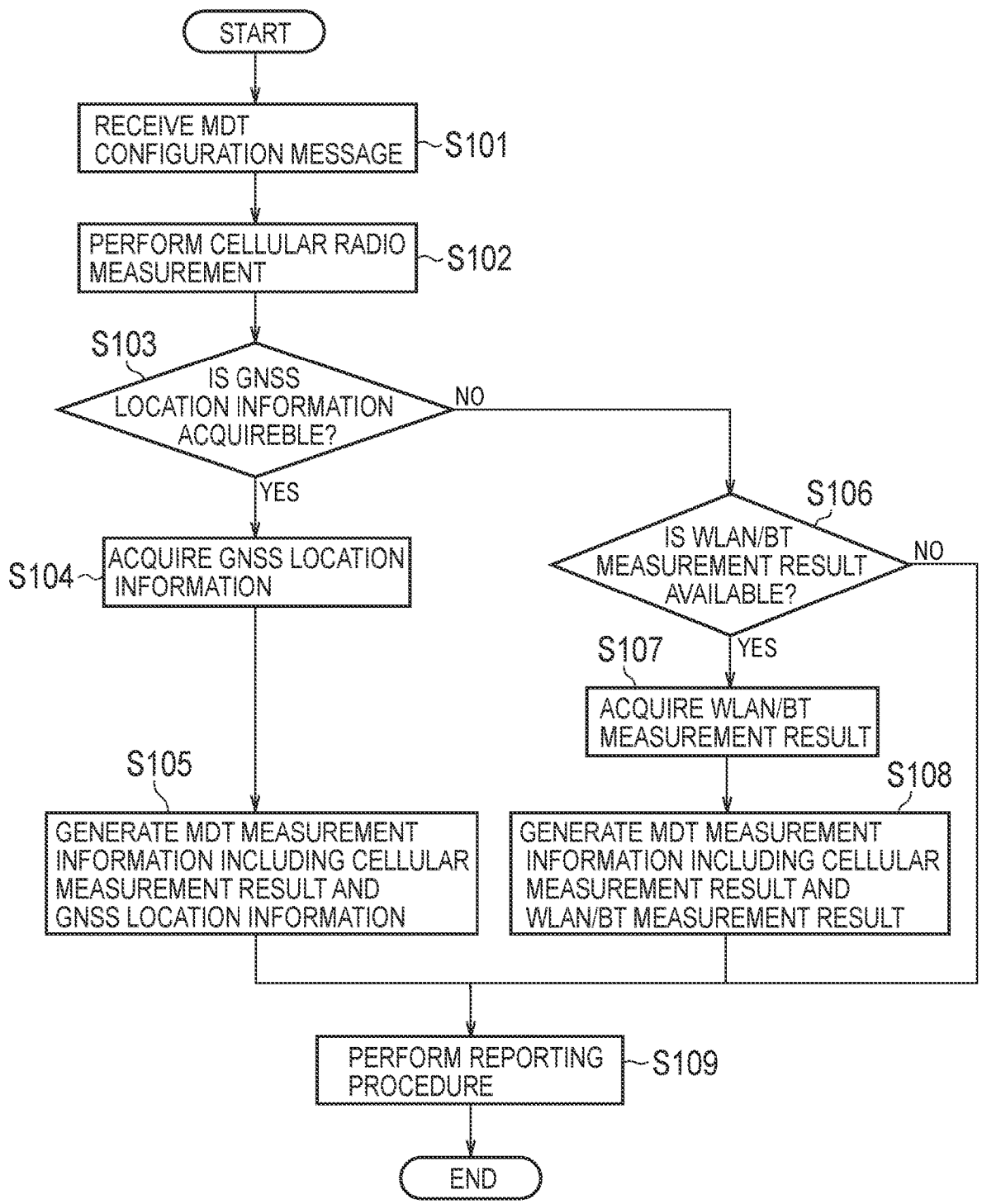

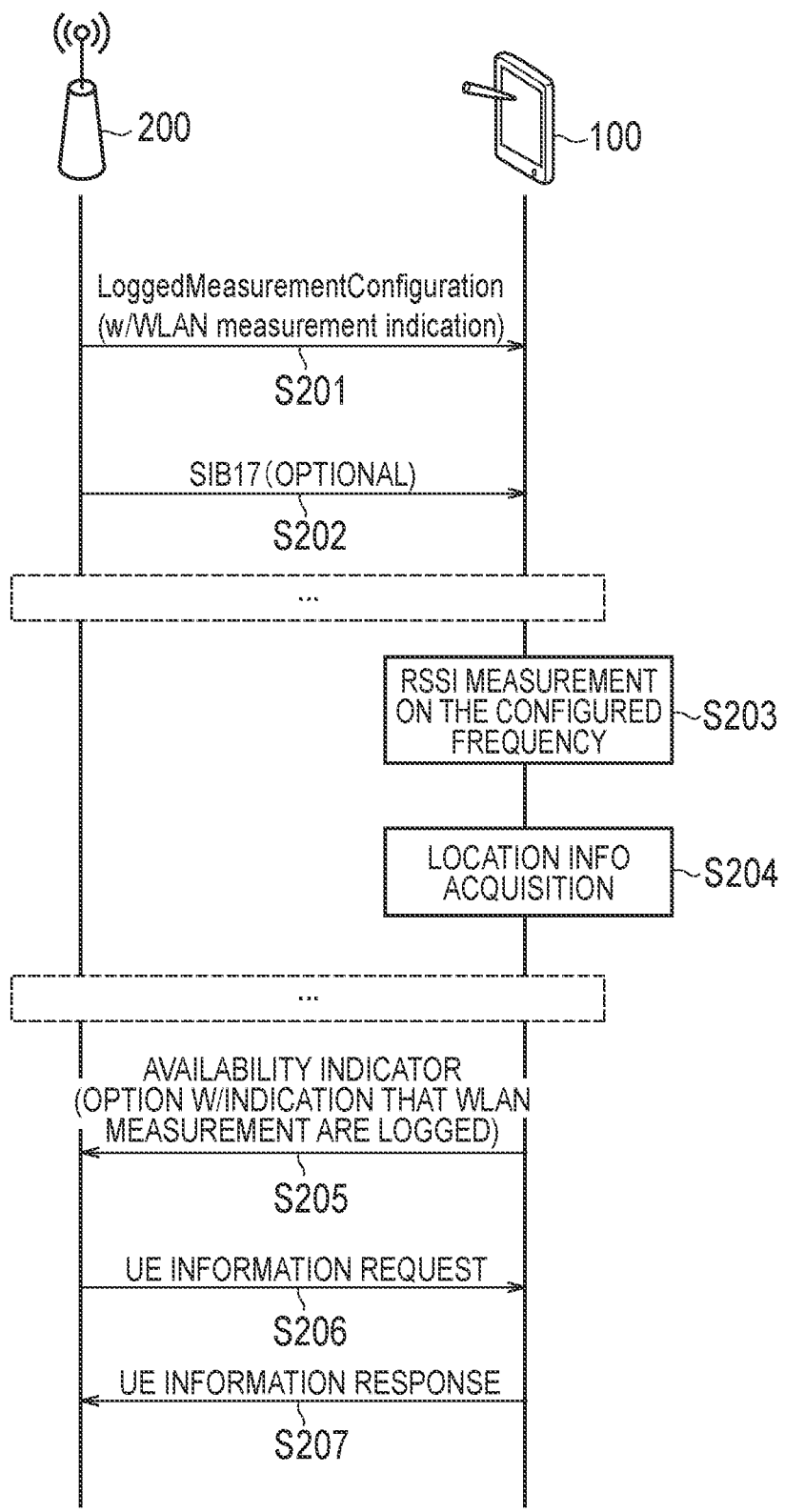

USER EQUIPMENT

RELATED APPLICATIONS

The present application is a continuation based on PCT Application No. PCT/JP2019/005566, filed on Feb. 15, 2019, which claims the benefit of U.S. Provisional Application No. 62/630,922 (filed on Feb. 15, 2018). The content of which is incorporated by reference herein in their entirety.

TECHNICAL FIELD

The present invention relates to a user equipment of a cellular communication system.

BACKGROUND ART

MDT (Minimization of Drive Tests) is specified in 3GPP (Third Generation Partnership Project), which is a standardization project of a cellular communication system. The MDT is a function in which a user equipment measures a radio environment and reports a measurement result to a network together with location information to optimize a network.

SUMMARY

A user equipment according to one aspect is a user equipment of a cellular communication system, the user equipment comprising a communicator configured to perform a radio communication by WLAN and/or Bluetooth, a cellular receiver configured to receive a configuration message which is transmitted from a network of the cellular communication system and sets an MDT measurement in which the cellular communication system is set as a measurement target, a controller configured to perform a radio measurement on the cellular communication system based on the configuration message, and a transmitter. The controller is configured to record MDT measurement information including a measurement result for the cellular communication system. The controller is configured to include the measurement result for the WLAN and/or the Bluetooth in the MDT measurement information when the measurement result for the WLAN and/or the Bluetooth is available. The transmitter is configured to transmit, to the network, a first availability indicator indicating that the measurement result for the cellular communication system is included in the MDT measurement information. When the measurement result for the WLAN and/or the Bluetooth is included in the MDT measurement information, the transmitter is configured to transmit, to the network, a second availability indicator indicating that the measurement result for the WLAN and/or the Bluetooth is further included in the MDT measurement information.

A user equipment according to one aspect is a user equipment of a cellular communication system, the user equipment comprising a communicator configured to perform a radio communication by WLAN and/or Bluetooth, a cellular receiver configured to receive a configuration message which is transmitted from a network of the cellular communication system and sets a logged MDT measurement, a controller configured to perform a radio measurement on the WLAN and/or the Bluetooth based on the configuration message and record MDT measurement information including a measurement result, and a cellular transmitter configured to transmit, to the network, the MDT measurement information in response to a request from the network. The cellular receiver is further configured to receive a system information block configured to be transmitted in a cell of the network by broadcast and include an identifier list. The identifier list includes one or more WLAN identifiers and/or one or more Bluetooth identifiers. The controller is configured to perform a radio measurement on the WLAN and/or the Bluetooth only for identifiers in the identifier list.

BRIEF DESCRIPTION OF DRAWINGS

FIG. 6 is a diagram illustrating an operation flow of the UE according to a first embodiment.

FIG. 7 is a diagram illustrating an operation flow of the eNB and the UE according to a second embodiment.

DESCRIPTION OF EMBODIMENTS

Figure 1:
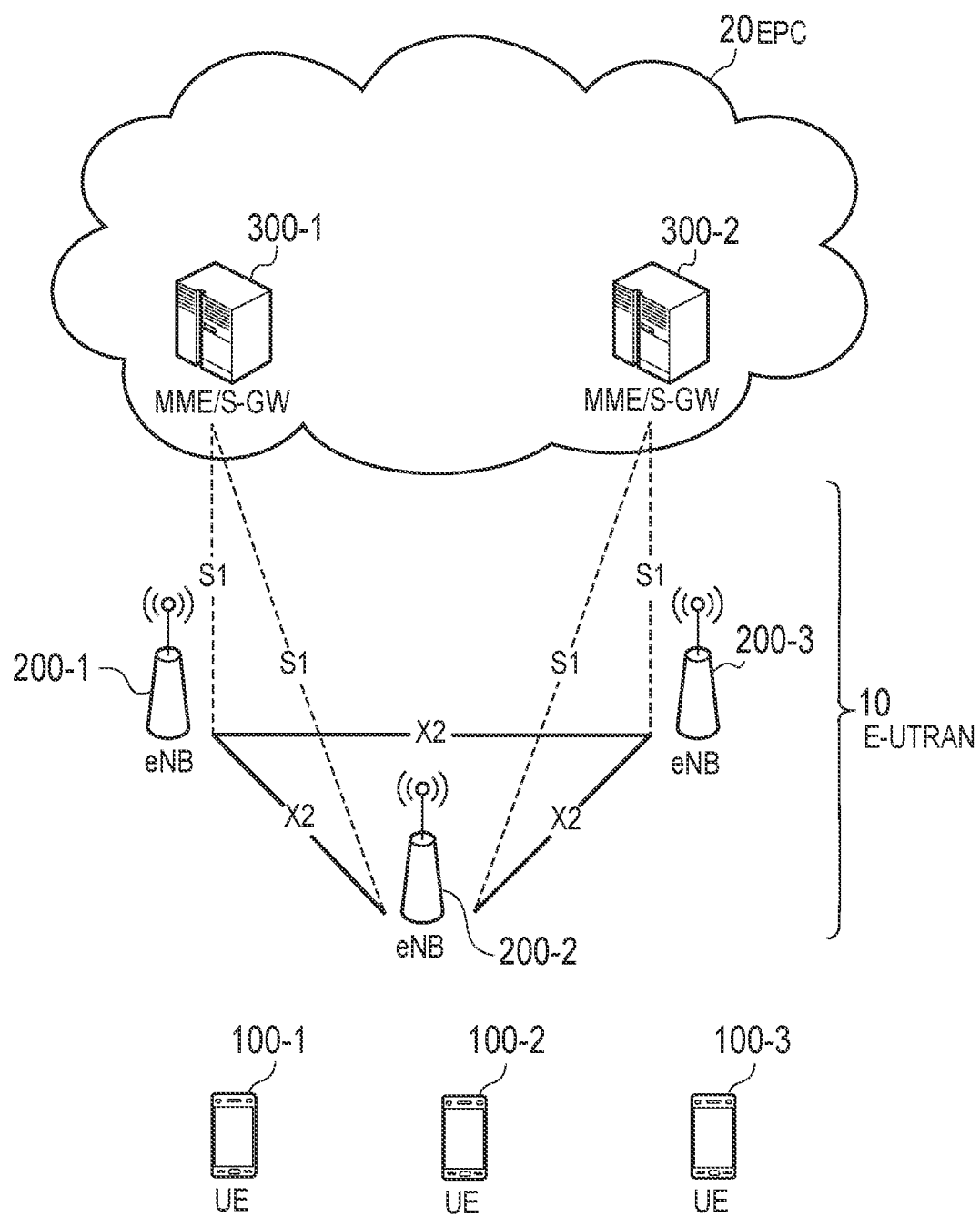
FIG. 1 is a diagram illustrating a configuration of an LTE system according to an embodiment.

An embodiment of the present invention will be described with reference to the drawings. In the drawings related to the following embodiments, the same or similar reference numerals are given to the same or similar parts.

First Embodiment (Cellular Communication System)

The configuration of a cellular communication system according to a first embodiment will be described. FIG. 1 is a diagram illustrating a configuration of an LTE (Long Term Evolution) system which is the cellular communication system according to the first embodiment. The LTE system is a cellular communication system based on the 3GPP standard.

The LTE system includes a user equipment (UE) 100, a radio access network (E-UTRAN: Evolved-UMTS Terrestrial Radio Access Network) 10, and a core network (EPC: Evolved Packet Core) 20. The E-UTRAN10 and the EPC20 form an LTE network which is a network of the LTE system.

The UE 100 is a mobile communication device. The UE 100 performs radio communication with an eNB 200 which manages a cell (serving cell) where the UE 100 exists. In the first embodiment, the UE 100 has a function of performing short-range radio communication by WLAN (Wireless Local Area Network) and/or Bluetooth (hereinafter, referred to as "BT") in addition to the function of performing cellular communication by LTE.

The E-UTRAN 10 includes base stations (eNB: evolved Node-B) 200. The eNBs 200 are connected to each other via an X2 interface. The eNB 200 manages one or a plurality of cells. The eNB 200 performs radio communication with the UE 100 which establishes a connection with the cell managed by the corresponding eNB 200. The eNB 200 has a radio resource management (RRM) function, a user data (hereinafter simply referred to as "data") routing function, a measurement control function for mobility control/scheduling, and the like. The "cell" is used as a term indicating a minimum unit of a radio communication area. The "cell" is also used as a term indicating a function or resource for performing radio communication with the UE 100. One cell belongs to one carrier frequency.

The EPC 20 includes a mobility management entity (MME) and a serving gateway (S-GW) 300. The MME performs various mobility controls for the UE 100. The MME manages the information of a tracking area (TA) where the UE 100 exists by communicating with the UE 100 using NAS (Non-Access Stratum) signaling. The S-GW controls data transfer. The MME and the S-GW 300 are connected to the eNB 200 via a S1 interface.

Figure 2:
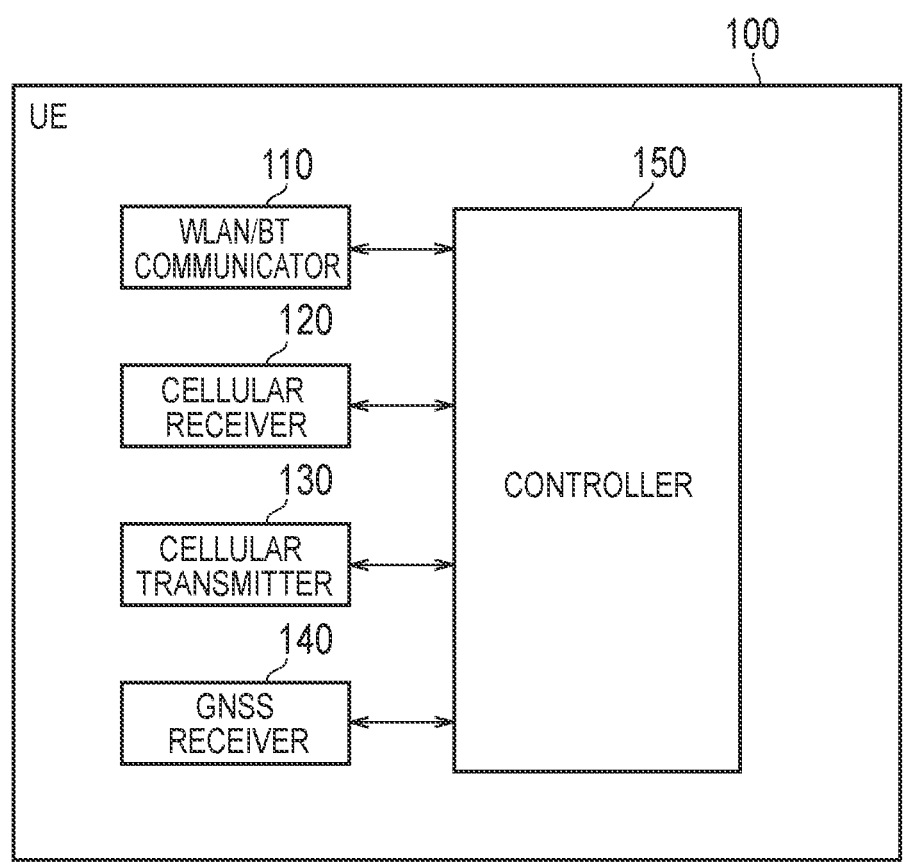
FIG. 2 is a diagram illustrating a configuration of a UE (user equipment) according to the embodiment.

FIG. 2 is a diagram illustrating a configuration of the UE 100 (user equipment). The UE 100 includes a WLAN/BT communicator 110, a cellular receiver 120, a cellular transmitter 130, a GNSS (Global Navigation Satellite System) receiver 140, and a controller 150.

The WLAN/BT communicator 110 performs short-range radio communication based on WLAN and/or BT under the control of the controller 150. The WLAN corresponds to IEEE 802.11 standards, and the BT corresponds to IEEE 802.15.1 standard. The WLAN/BT communicator 110 includes an antenna, a transmitting unit, and a receiving unit. The receiving unit converts the WLAN/BT radio signal received by the antenna into a baseband signal (reception signal) and outputs the signal to the controller 150. The transmitting unit converts the baseband signal (transmission signal) output by the controller 150 into a WLAN/BT radio signal and transmits the signal from the antenna.

The cellular receiver 120 performs various types of reception in LTE communication under the control of the controller 150. The cellular receiver 120 includes an antenna and a receiving unit. The receiving unit converts the LTE radio signal received by the antenna into a baseband signal (reception signal) and outputs the signal to the controller 150.

The cellular transmitter 130 performs various types of transmission in LTE communication under the control of the controller 150. The cellular transmitter 130 includes an antenna and a transmitting unit. The transmitting unit converts the baseband signal (transmission signal) output by the controller 150 into an LTE radio signal and transmits the signal from the antenna.

The GNSS receiver 140 receives a signal from the GNSS satellite to acquire GNSS location information indicating the geographical location of the UE 100, and outputs the GNSS location information to the controller 150.

The controller 150 performs various controls in the UE 100. The controller 150 includes at least one processor and memory. The memory stores a program executed by the processor and information used for processing by the processor. The processor may include a baseband processor and a CPU (Central Processing Unit). The baseband processor performs modulation/demodulation and coding/decoding of baseband signals. The CPU executes the program stored in the memory to perform various types of processing. The processor executes the processing described below.

Figure 3:
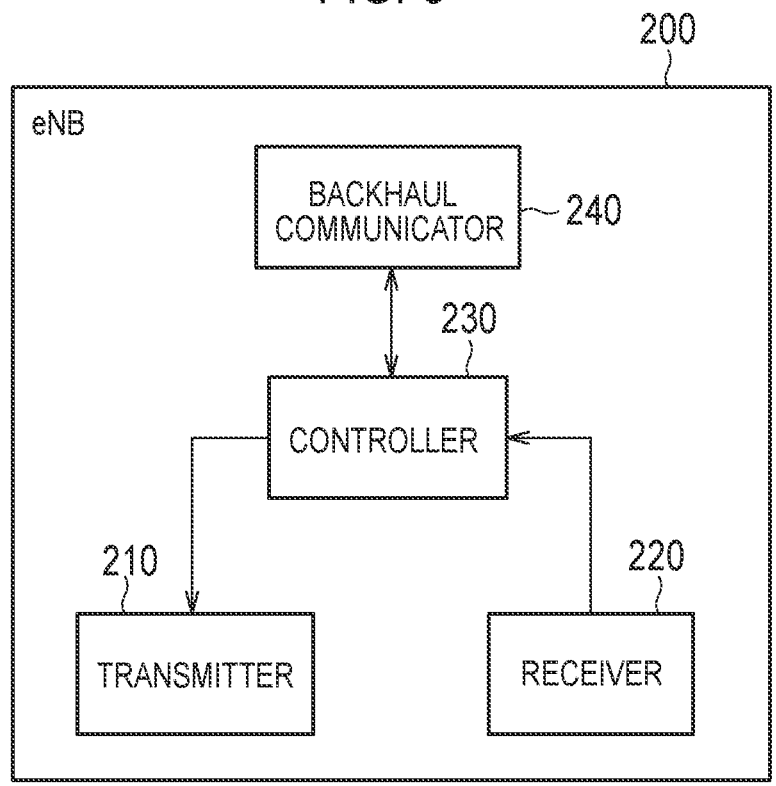
FIG. 3 is a diagram illustrating a configuration of an eNB (base station) according to the embodiment.

FIG. 3 is a diagram illustrating a configuration of the eNB 200 (base station). The eNB 200 includes a transmitter (cellular transmitter) 210, a receiver (cellular receiver) 220, a controller 230, and a backhaul communicator 240.

The transmitter 210 performs various types of transmission in LTE communication under the control of the controller 230. The transmitter 210 includes an antenna and a transmitting unit. The transmitting unit converts the baseband signal (transmission signal) output by the controller 230 into an LTE radio signal and transmits the signal from the antenna.

The receiver 220 performs various types of reception in LTE communication under the control of the controller 230. The receiver 220 includes an antenna and a receiving unit. The receiving unit converts the LTE radio signal received by the antenna into a baseband signal (reception signal) and outputs the signal to the controller 230.

The controller 230 performs various controls in the eNB 200. The controller 230 includes at least one processor and memory. The memory stores a program executed by the processor and information used for processing by the processor. The processor may include a baseband processor and a CPU. The baseband processor performs modulation/demodulation and coding/decoding of baseband signals. The CPU executes the program stored in the memory to perform various types of processing. The processor executes the processing described below.

The backhaul communicator 240 is connected to an adjacent eNB via the X2 interface. The backhaul communicator 240 is connected to the MME and the S-GW 300 via the S1 interface. The backhaul communicator 240 is used for communication performed on the X2 interface, communication performed on the S1 interface, and the like.

Figure 4:
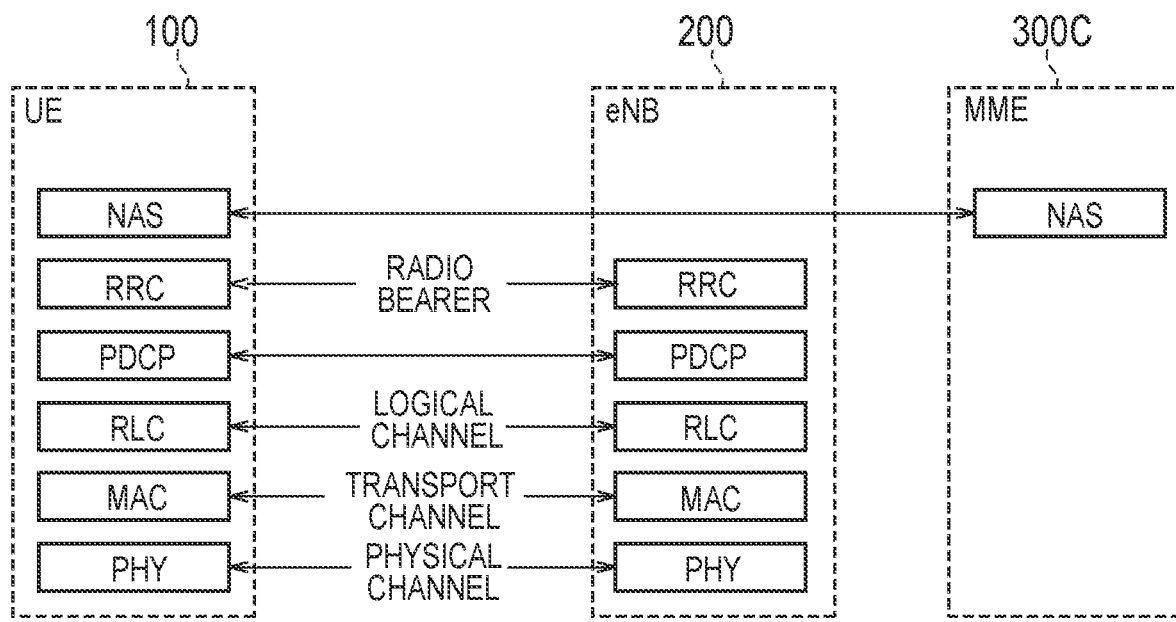
FIG. 4 is a diagram illustrating a configuration of a protocol stack of a radio interface in the LTE system according to the embodiment.

FIG. 4 is a diagram illustrating a configuration of a protocol stack of a radio interface in the LTE system. As illustrated in FIG. 4, the radio interface protocol is divided into the first to third layers of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer. The PHY layer, the MAC layer, the RLC layer, the PDCP layer, and the RRC layer form an AS (Access Stratum) layer.

The PHY layer performs encoding/decoding, modulation/demodulation, antenna mapping/demapping, and resource mapping/demapping. Data and control information are transmitted via a physical channel between the PHY layer of the UE 100 and the PHY layer of the eNB 200.

The MAC layer performs data priority control, retransmission processing by hybrid ARQ (HARQ), random access procedure, and the like. Data and control information are transmitted via a transport channel between the MAC layer of the UE 100 and the MAC layer of the eNB 200. The MAC layer of the eNB 200 includes a scheduler. The scheduler determines a transport format (a transport block size and a modulation and coding scheme (MCS)) of up-and-down link and an allocation resource block to the UE 100.

The RLC layer uses the functions of the MAC layer and the PHY layer to transmit data to the RLC layer on the reception side. Data and control information are transmitted via a logical channel between the RLC layer of the UE 100 and the RLC layer of the eNB 200.

The PDCP layer performs header compression/decompression and encryption/decryption.

The RRC layer is defined only in a control plane which handles control information. RRC signaling for various configurations is transmitted between the RRC layer of the UE 100 and the RRC layer of the eNB 200. The RRC layer controls logical channels, transport channels and physical channels according to establishment, re-establishment, and release of radio bearers. In a case where there is a connection (RRC connection) between the RRC of the UE 100 and the RRC of the eNB 200, the UE 100 is in an RRC connected mode. In a case where there is no connection (RRC connection) between the RRC of the UE 100 and the RRC of the eNB 200, the UE 100 is in an RRC idle mode.

The NAS layer positioned above the RRC layer performs session management, mobility management, and the like. NAS signaling is transmitted between the NAS layer of the UE 100 and the NAS layer of an MME 300C. The UE 100 has functions such as an application layer in addition to the protocol of the radio interface.

(Operation Scenario According to First Embodiment)

Figure 5:
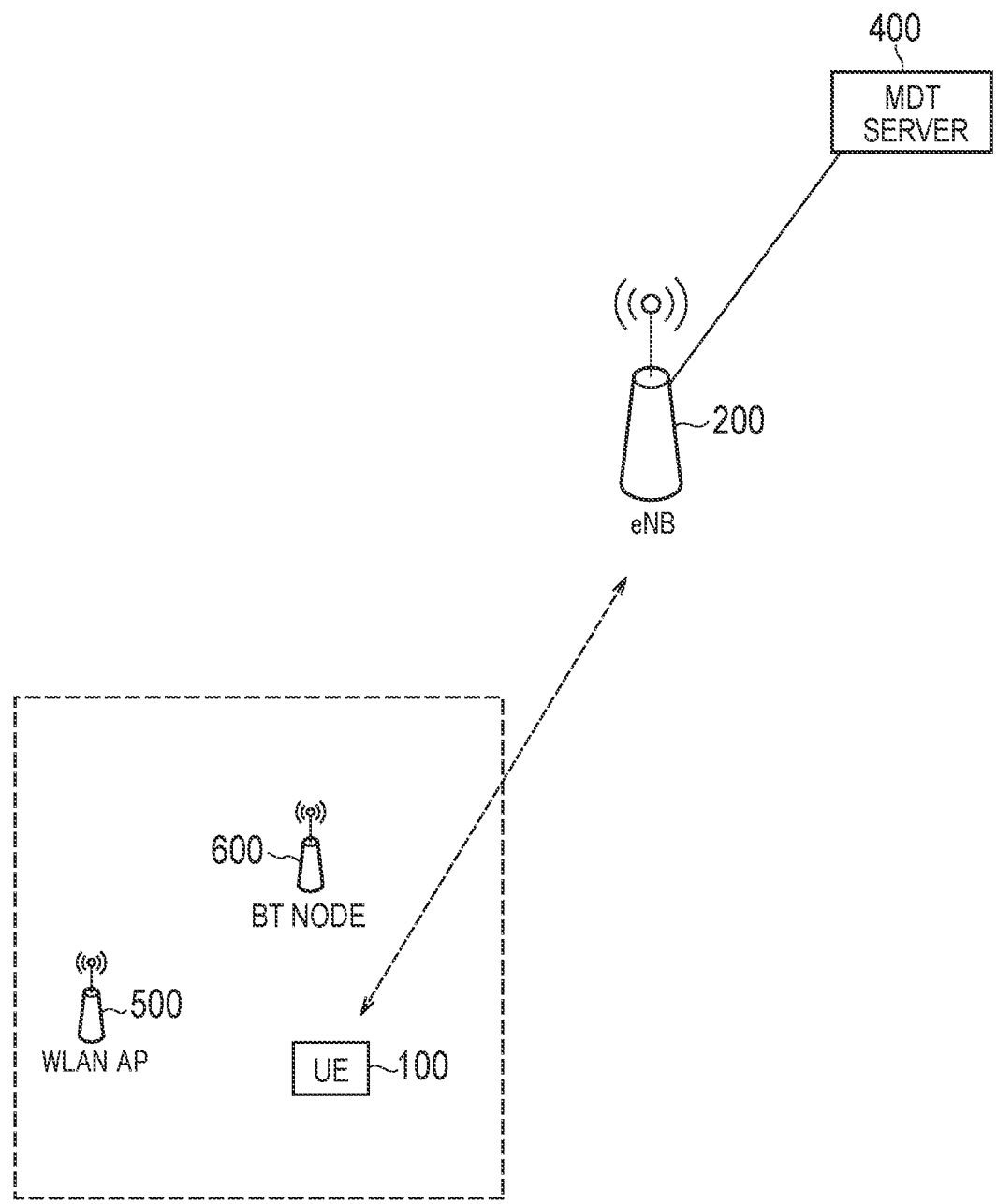
FIG. 5 is a diagram illustrating an operation scenario of the LTE system according to the embodiment.

FIG. 5 is a diagram illustrating an operation scenario of the LTE system according to the first embodiment. In the first embodiment, a scenario is assumed in which measurement results for WLAN and/or BT are collected using MDT technology.

As illustrated in FIG. 5, the UE 100 is located indoors. In addition, a WLAN AP 500 and a BT node 600 are installed indoors. By communicating with the WLAN AP 500 and/or the BT node 600 indoors, the UE 100 can reduce the load on the eNB 200 and speed up the communication.

The eNB 200 transmits a configuration message for setting MDT measurement to the UE 100. Further, the eNB 200 collects MDT measurement information from the UE 100. The eNB 200 is directly or indirectly connected to a MDT server 400. The MDT server 400 acquires the MDT measurement information from the eNB 200, and performs network optimization including optimization of coverage on the basis of the MDT measurement information.

The MDT has two types of immediate MDT and logged MDT. In the immediate MDT, the UE 100 in the RRC connected mode performs radio measurement, and transmits a measurement report including the measurement result and UE location information to the LTE network (eNB 200). The configuration message for setting the immediate MDT may be a measurement configuration message including an information element requesting that the UE location information is included in the measurement report. In the immediate MDT, the measurement report including the measurement result and the UE location information corresponds to the MDT measurement information.

In the logged MDT, the UE 100 in the RRC idle mode or the RRC connected mode performs radio measurement, records the measurement result together with the UE location information and a time stamp, and transmits the recorded log information (measurement log) in response to the request from the LTE network (eNB 200). In the logged MDT, the log information (measurement log) corresponds to the MDT measurement information.

Here, a general RRC idle mode Logged MDT (Logged MDT in Idle) in the LTE system will be described. The Logged MDT includes processing such as MDT measurement configuration (Measurement configuration), MDT measurement (Measurement collection), and measurement result reporting (Measurement reporting).

First, in the MDT measurement configuration, the UE 100 in the RRC connected mode receives the MDT configuration message (Logged Measurement Configuration message) from the LTE network and stores various MDT configuration parameters included in the MDT configuration message. The MDT configuration parameters include logging events, a logging period, a network absolute time, and the like. Here, logging means a series of operations for measuring the radio environment and storing the measurement results. Further, the logging event is an event for which logging is necessarily performed. Currently, periodic logging is specified and a logging period is specified. The logging period is a period during which logging is necessarily performed and is specified as a period until the MDT measurement ends after the MDT measurement configuration is performed. The network absolute time is a time serving as a reference of the time stamp to be added to the measurement result of the radio environment.

Secondly, in the MDT measurement, the UE 100 in the RRC idle mode performs logging according to the MDT configuration parameter (Configuration). The UE 100 measures the radio environment of the serving cell (and an adjacent cell) when the event corresponding to the logging event occurs. The radio environment is, for example, reference signal reception power (RSRP) and reference signal reception quality (RSRQ).

The UE 100 stores the measurement result together with the location information and the time stamp. A combination of the measurement result, the location information, and the time stamp is called a measurement log. When the logging period expires, the UE 100 terminates the MDT measurement and activates a timer which specifies the period (forty-eight hours by specification) in which the measurement result (measurement log) is necessarily held.

Third, in the measurement result reporting, for example, when transitioning from the RRC idle mode to the RRC connected mode or during handover, the UE 100 transmits an availability indicator indicating that the measurement result is held from the UE 100 to the LTE network. The LTE network (eNB 200) requests the UE 100 to transmit (report) the measurement result on the basis of the availability indicator. The UE 100 transmits the measurement result (measurement log) to the LTE network in response to the request from the LTE network.

(Operation Flow According to First Embodiment)

FIG. 6 is a diagram illustrating an operation flow of the UE 100 according to the first embodiment.

As illustrated in FIG. 6, in step S101, the UE 100 (cellular receiver 120) receives the configuration message which is transmitted from the LTE network and sets the MDT measurement in which the LTE system is a measurement target. The configuration message may set the immediate MDT or may set the logged MDT. However, the configuration message according to the first embodiment does not set WLAN and/or BT as a measurement target. For example, the configuration message does not include an information element for setting RSSI (Received Signal Strength Indicator) measurement for WLAN/BT and/or an information element in which a WLAN/BT frequency band (unlicensed band) is a measurement target.

In step S102, the UE 100 (controller 150) executes the cellular radio measurement. For example, the UE 100 (controller 150) measures the RSRP and RSRQ of the serving cell (and the adjacent cell) of the LTE network.

In step S103, the UE 100 (controller 150) determines whether or not the GNSS location information can be acquired. For example, in a case where the GNSS receiver 140 is in an on-state, and the reception level of a GNSS signal is equal to or higher than a threshold, the UE 100 (controller 150) may determine that the GNSS location information can be acquired. In a case where the GNSS receiver 140 is in the on-state, and the reception level of the GNSS signal is lower than the threshold value, the UE 100 (controller 150) may determine that the GNSS location information cannot be acquired. In a case where the GNSS receiver 140 is in an off-state, the UE 100 (controller 150) may determine that the GNSS location information cannot be acquired.

In a case where the GNSS location information can be acquired (step S103: YES), the UE 100 (controller 150) acquires the GNSS location information in step S104. Further, the UE 100 (controller 150) generates the MDT measurement information (measurement report or measurement log) including the cellular measurement result acquired in step S102 and the GNSS location information. Thereafter, in step S109, the UE 100 (cellular transmitter 130) transmits the MDT measurement information to the eNB 200. In the case of the logged MDT, the UE 100 (cellular transmitter 130) transmits the availability indicator and then transmits the measurement log in response to the request from the eNB 200.

On the other hand, in a case where the GNSS location information cannot be acquired (step S103: NO), in step S106, the UE 100 (controller 150) determines whether or not the measurement result for WLAN and/or BT is available. For example, in a case where the WLAN/BT communicator 110 is in the on-state, and the WLAN radio signal (WLAN beacon) or RSSI of the BT radio signal (BT beacon) is equal to or higher than the threshold, the UE 100 (controller 150) may determine that the measurement result for WLAN and/or BT is available.

In a case where the measurement result for WLAN and/or BT is available (step S106: YES), the UE 100 (controller 150) acquires the measurement result for WLAN and/or BT in step S107. The measurement result (WLAN/BT measurement result) includes a combination of a transmission source identifier (a WLAN identifier or a BT identifier) included in the WLAN radio signal or the BT radio signal and the RSSI. The UE 100 (controller 150) may perform multiple measurements on WLAN and/or BT to acquire a plurality of measurement results. Further, the UE 100 (controller 150) generates the MDT measurement information (measurement report or measurement log) including the cellular measurement result acquired in step S102 and the WLAN/BT measurement result. The UE 100 (controller 150) may include a plurality of WLAN/BT measurement results in the MDT measurement information. Further, the upper limit number of WLAN measurement results which can be included in the MDT measurement information and/or the upper limit number of BT measurement results which can be included in the MDT measurement information may be specified. Thereafter, in step S109, the UE 100 (cellular transmitter 130) transmits the MDT measurement information to the eNB 200. In the case of the logged MDT, the UE 100 (cellular transmitter 130) transmits the availability indicator and then transmits the measurement log in response to the request from the eNB 200.

If the measurement result for WLAN and/or BT is not available (step S106: NO), the UE 100 (controller 150) generates the MDT measurement information (measurement report or measurement log) including the cellular measurement result acquired in step S102. In such a case, the cellular measurement result may be used as location information (RF fingerprint). Thereafter, in step S109, the UE 100 (cellular transmitter 130) transmits the MDT measurement information to the eNB 200. In the case of the logged MDT, the UE 100 (cellular transmitter 130) transmits the availability indicator and then transmits the measurement log in response to the request from the eNB 200.

Summary of First Embodiment

In the first embodiment, the UE 100 (cellular receiver 120) receives the configuration message which is transmitted from the network of the LTE system (LTE network) and sets the MDT measurement in which the LTE system is a measurement target. The UE 100 (controller 150) performs radio measurement for the LTE system on the basis of the configuration message. In a case where the measurement result for WLAN and/or BT is available, the UE 100 (controller 150) includes the measurement result for WLAN and/or BT in the MDT measurement information.

Specifically, in a case where the GNSS location information is not acquirable, and the measurement result for WLAN and/or BT is available, the UE 100 (controller 150) includes the measurement result for WLAN and/or BT in the MDT measurement information. Accordingly, for example, in a case where the GNSS cannot be received indoors, or the reception state is extremely poor, the measurement result for WLAN and/or BT can be used as location information (RF fingerprint). Therefore, the LTE network (MDT server 400) can accurately grasp the geographical location of the UE 100. Further, in a case where the GNSS cannot be received, or the reception state is extremely poor, the UE 100 can be regarded as indoor. In such a case, by including the measurement result for WLAN and/or BT in the MDT measurement information, the LTE network (MDT server 400) can grasp the coverage situation of the indoor WLAN and/or BT and optimize the coverage of the WLAN and/or BT.

In the first embodiment, in a case where the measurement result for WLAN and/or BT is available although the configuration message does not set WLAN and/or BT as a measurement target, the UE 100 (controller 150) autonomously includes the measurement result for WLAN and/or BT in the MDT measurement information. Accordingly, for example, even in a case where the LTE network cannot predict that the UE 100 enters indoors, the UE 100 autonomously includes the measurement result for WLAN and/or BT in the MDT measurement information, so that the LTE network (MDT server 400) can collect the measurement results for WLAN and/or BT.

Second Embodiment

The differences between a second embodiment and the first embodiment will be mainly described. An operation scenario according to the second embodiment is similar to that of the first embodiment. However, the second embodiment is an embodiment only for the logged MDT. Further, in the second embodiment, the configuration message may set WLAN and/or BT as a measurement target and may not set the LTE system as a measurement target.

(Operation Flow According to Second Embodiment)

FIG. 7 is a diagram illustrating an operation flow of the eNB 200 and the UE 100 according to the second embodiment. Here, an example will be described in which the configuration message sets WLAN as a measurement target. However, in addition to WLAN or in place of WLAN, BT may be set as a measurement target.

As illustrated in FIG. 7, in step S201, the eNB 200 transmits, by unicast, a configuration message (Logged Measurement Configuration) for setting the logged MDT in which WLAN is set as a measurement target to the UE 100. For example, the configuration message (Logged Measurement Configuration) includes an information element for setting the RSSI measurement for WLAN and/or an information element in which the frequency band (unlicensed band) of WLAN is set as a measurement target. The UE 100 receives the configuration message (Logged Measurement Configuration).

In step S202, the eNB 200 transmits a system information block including an identifier list by broadcast. The identifier list includes one or more WLAN identifiers. The system information block may be system information block type 17 (SIB 17) for traffic steering between the LTE system and WLAN. The WLAN identifier in the SIB 17 indicates a WLAN AP which is under the management of the LTE network (cellular operator). The UE 100 receives the SIB 17.

In step S203, the UE 100 performs WLAN measurement only on the WLAN identifier in the SIB 17. For example, the UE 100 searches only the WLAN radio signal having the WLAN identifier in the SIB 17 at the frequency set by the configuration message (Logged Measurement Configuration) and measures the RSSI of the detected WLAN radio signal.

In step S204, the UE 100 may acquire the UE location information. The UE location information may be a BT measurement result and/or a measurement result for WLAN which is not measured in step S203. However, since the WLAN measurement result is acquired in step S203, the network can recognize that the UE 100 exists near the WLAN AP corresponding to the WLAN measurement result. Therefore, the acquisition of the UE location information in step S204 can be omitted. Further, the UE 100 records the measurement log including the WLAN measurement result (WLAN identifier and RSSI) and the UE location information. Incidentally, the processes of steps S203 and S204 may be performed in the RRC idle mode, or may be performed in the RRC connected mode.

The UE 100 (cellular transmitter 130) transmits an availability indicator indicating that the MDT measurement information (measurement log) is included to the eNB 200. Here, the availability indicator not only indicates that the measurement log is included but also indicates that the WLAN measurement result is included in the measurement log. For example, the availability indicator according to the second embodiment is specified as the information element different from the availability indicator of the general RRC idle mode Logged MDT. Alternatively, in the availability indicator according to the second embodiment, a flag indicating that the WLAN measurement result is also included in the measurement log may be added to the availability indicator of the general RRC idle mode Logged MDT.

The eNB 200 determines whether to acquire the measurement log from the UE 100 on the basis of the availability indicator received from the UE 100. Here, the description will be advanced assuming that the eNB 200 determines to acquire the measurement log.

In step S206, the eNB 200 transmits a transmission request (UE Information Request) of the measurement log to the UE 100.

In step S207, the UE 100 transmits a message (UE Information Response) including the measurement log to the eNB 200 in response to the reception of the transmission request (UE Information Request).

Summary of Second Embodiment

In the second embodiment, the UE 100 (cellular receiver 120) receives the system information block which is transmitted in a cell of the LTE network by broadcast and includes the identifier list. The identifier list includes one or more WLAN identifiers and/or one or more BT identifiers. The UE 100 (controller 150) performs radio measurement on WLAN and/or BT only for the identifiers in the identifier list. Accordingly, the WLAN AP and/or BT node located in the cell can be detected and measured efficiently as compared with a case where the UE 100 detects WLAN and/or BT by a full search. Further, the identifiers in the identifier list indicate WLAN APs and/or BT nodes under the management of the LTE network (cellular operator). Therefore, only the measurement results of the WLAN APs and/or BT nodes targeted for coverage optimization can be collected efficiently.

In the second embodiment, the UE 100 (cellular transmitter 130) transmits the availability indicator indicating that the MDT measurement information is included to the LTE network, and then transmits the MDT measurement information to the LTE network in response to a request from the LTE network. The availability indicator not only indicates that the MDT measurement information is included but also indicates that the measurement result for WLAN and/or BT is included in the MDT measurement information. Accordingly, the LTE network (eNB 200) can determine whether or not to request the UE 100 to transmit (report) the MDT measurement information on the basis of the presence/absence of the measurement result for WLAN and/or BT. Therefore, the measurement results for WLAN and/or BT can be collected efficiently.

Another Embodiment

In the second embodiment, the operation example is described in which the UE 100 performs the WLAN measurement only on the WLAN identifier in the SIB 17 (step S203) and then acquires UE location information (step S204). However, in a case where the WLAN measurement targeted in step S203 is impossible, the operation of step S204 at such timing may be omitted.

In the above-described embodiment, the LTE system is exemplified as the cellular communication system. However, the present invention is not limited to the LTE system. The operation according to the above-described embodiment may be applied to a cellular communication system (for example, a fifth-generation cellular communication system) other than the LTE system.

In the above-described embodiment, Bluetooth is exemplified, but the Bluetooth version is not particularly mentioned. However, various versions of Bluetooth, for example, Bluetooth Low Energy (BLE) is available.

A program which causes a computer to execute each process performed by the UE 100 and the eNB 200 may be provided. Further, the program may be recorded in a computer-readable medium. A computer readable medium can be used to install the program on a computer. Here, the computer-readable medium in which the program is recorded may be a non-transitory recording medium. The non-transitory recording medium is not particularly limited, but may be a recording medium such as a CD-ROM or a DVD-ROM. A chipset configured by a memory which stores a program for executing each process performed by the UE 100 and the eNB 200 and a processor which executes the program stored in the memory may be provided.

APPENDIX

1. Introduction

Bluetooth (BT) and WLAN measurement collection in MDT introduce to monitor and assess coverage performance of BT and WLAN network and also to provide location information for the associated other MDT measurements. In this appendix, we discuss possible solutions for satisfying above objective.

2. Discussion

It was agreed to introduce BT and WLAN measurement collection in MDT. there are two different scenarios when WLAN/BT MDT is useful:

Scenario 1: WLAN measurement to assess indoor performance

Scenario 2: WLAN/BT measurements to provide location information for the associated other MDT measurements In our understanding scenario 1, WLAN measurement results will be used for indoor performance improvement. On the other hand, WLAN/BT measurement results are just used as detailed location information in scenario 2. So we believe they should be discussed separately since UE behavior do not need to be the same between the two scenarios as the requirements are different. For example, we think BT measurement results are not helpful to assess indoor performance for scenario 1. Although it may be ideal to have a common solution for both scenarios, RAN2 should first discuss the scenarios separately before further discussion of whether a common solution is viable.

Proposal 1: RAN2 should discuss Scenario 1 and Scenario 2 separately.

Since UE power consumption is always an issue esp. for MDT, UEs should not be required to report/log WLAN and BT measurements if they are not available. In other words, UE don't need to measure WLAN/BT if their radios are not turned on even though WLAN/BT MDT is configured.

Proposal 2: UEs don't need to measure WLAN/BT if their radios are not turned on even though WLAN/BT MDT is configured.

(2.1. WLAN Measurement to Assess Indoor Performance (Scenario 1))

MDT is introduced in Release 10 and enhanced in subsequent releases. Currently 3 MDT mechanisms i.e., Immediate MDT, Logged MDT in IDLE and Logged MDT in CONN/IDLE are standardized. For reducing standardization work, existing mechanisms should be reused as much as possible. Then RAN2 should discuss which one of the mechanisms should be adopted as the baseline mechanism this scenario. We think measurements in both IDLE and CONN modes are needed since WLAN communication occurs regardless of the RRC state. So if RAN2 selects Logged MDT in IDLE then Immediate MDT is also needed just as in Rel-10. Therefore, the possible alternatives are as follows:

Alt. 1: The combination of Immediate MDT and Logged MDT in IDLE

Alt. 2: Logged MDT in CONN/IDLE (which was standardized for MBSFN MDT) We believe Alt. 2 is simpler than Alt. 1 since the same configuration for IDLE and CONN can be provided to the UE once and applicable in both modes. The retrieval of the data is also cleaner since the NW wouldn't need to provide the TCE separate data for CONN and IDLE. Therefore, we propose Logged MDT in CONN/IDLE scheme (which was standardized for MBSFN MDT) should be applied for WLAN measurement to assess indoor performance.

Proposal 3: For WLAN measurement collection in MDT, measurements in both IDLE and CONN modes are needed.

Proposal 4: To assess indoor performance of WLAN, Logged MDT in CONN/IDLE scheme should be applied.

In order to include WLAN measurement results into the log, an optional indication "for WLAN measurement to assess indoor performance" should be introduced in Logged-MeasurementConfiguration. If this indication is configured and WLAN measurement is available, UE will log them as long as UE can measure WLAN RSSI and is within the configured logging area and duration. It can be further discussed if there needs to be a restriction on the maximum number of WLAN APs which can be included in log in one logging session.

Another related issue is if any restriction of the type of WLAN AP is needed for logging. In our understanding, for satisfying the object "to assess indoor performance", it's enough to log measurement results of WLAN AP deployed by operators. Also, if UE includes WLAN AP's measurement results which are not deployed by the operator, logging opportunities may be reduced since the UE don't need to continue logging if the size of log exceeds 64 kB.

One way to achieve logging restriction is for the NW to provide WLAN AP information in LoggedMeasurement-Configuration. However, the cell which configures the Logged MDT may be different from where the cell where the WLAN measurements are performed, so there is no guarantee that the UE will collect the WLAN AP measurement log as intended unless there is some commonality among WLAN APs from different cells. Another way is to reuse existing broadcast signal standardized for WLAN interworking i.e., if SIB17 is broadcasted, this would allow UEs to obtain the configurations of the operator's WLAN APs as it moves from cell to cell and the UE will only include measurement results of WLAN AP informed by SIB 17. However, this solution is only available for NW which WLAN interworking is introduced so it may be further considered if this information needs to be available in another SIB or a new SIB.

Proposal 5: RAN2 should discuss if any restriction of logging WLAN AP is needed to assess indoor performance.

Assuming Logged MDT is supported for WLAN measurements, it should also be considered whether the logging should be performed periodically as in the case of Logged MDT in IDLE in Rel-10 or there would be further restriction that logging is only performed when WLAN is available similar to the case for MBSFN MDT whereby the Logged MDT is only performed when the UE is receiving MBMS service. Since the reception of WLAN signal is not the same as receiving MBMS service, it would be difficult to configure the UE to log measurements only when WLAN AP is present. Therefore, the measurements should follow the Rel-10 MDT principle for Logged MDT with periodic measurements for the duration of the MDT campaign. Therefore, the UE should attempt to measure WLAN beacon signal periodically for the duration of the MDT campaign as long as the UE's WLAN radio is turned on.

Proposal 6: The UE should attempt to measure WLAN beacon signal periodically for the duration of the MDT campaign. Logged MDT measurements for WLAN should be performed periodically for the duration of the MDT campaign.

Assuming Logged MDT is supported for WLAN measurements and the logging is performed periodically as in Proposal 6, it should also be considered whether the UE should provide an indication to the eNB whether any WLAN or BT signal is logged. In most situations, the eNB would configure the UE to include WLAN/BT measurements in addition to downlink pilot strength measurements without knowing whether the UE will be in proximity of WLAN/BT during the duration of the MDT campaign. Therefore, in some cases the UE may only have logs associated with downlink pilot strength measurements. However, it is the objective to collect information associated with WLAN signals and not just the downlink pilot strength measurements from Rel-10. To prevent the eNB from collecting measurement reports that are not intended for the campaign we believe one of the two options below should be considered:

Opt. 1: The UE does not send the availability indicator to the eNB if no WLAN measurement is logged.

Opt. 2: The UE includes in the availability indicator an indication of whether any WLAN measurement is logged.

With Opt. 1, the UE is making the making the decision of whether the log is useful for the NW. The NW would not have the option to retrieve the log if it decided later on that such a log may still be useful. With Opt. 2 the UE behavior remains the same as in existing MDT in terms of when the availability indicator should be sent and from this perspective we think Opt. 2 is preferable.

Proposal 7: The UE includes in the availability indicator an indication of whether any WLAN measurement is logged.

(2.2. WLAN/BT Measurements to Provide Location Information for the Associated Other MDT Measurements (Scenario 2))

In this scenario, the WLAN/BT measurements may be used as the source of location information. For indoor UEs WLAN/BT RF fingerprints may be more reliable than GNSS if it's even available. However, for outdoor UEs, WLAN/BT RF fingerprints are not as useful since they are usually located indoors. Furthermore, GNSS and WLAN/BT are not usually available at the same time. Therefore, UEs should not include WLAN/BT RF fingerprints information in the log when GNSS signal is strong enough, even though UE configured "to measure WLAN/BT for using location information". If they are not included in log, logging opportunity may be increased due the memory size constraint for logging. Conversely, if GNSS signal is weak or GNSS is not available, UE should include WLAN/BT RF fingerprints information in log. If above approach is reasonable, an optional indication "for WLAN/BT measurements to provide location information for the associated other MDT measurements" should be introduced for obtaining the detailed location information.

Proposal 8: If GNSS measurement results are available then the UE shouldn't need to measure WLAN/BT for using location information.

Proposal 9: If the UE is configured with WLAN/BT measurements for location information, the UE will attempt to measure, report and log WLAN/BT signals for using location information only when GNSS signal is not available.

In contrast to the scenario 1 for indoor performance, we believe the use Alt 1 in section 2.1 (The combination of Immediate MDT and Logged MDT in IDLE) is more appropriate for scenario 2 since Immediate MDT also has the advantage for operators to improve cellular performance since Power Headroom measurement, Scheduled IP Throughput measurement, Packet Delay measurement, Packet Loss rate measurement are all part of Immediate MDT and WLAN/BT measurement results are just used as detailed location information.

Proposal 10: For measurement of location information, the combination of Immediate MDT and Logged MDT in IDLE should be adopted.

Assuming Proposal 10 is agreeable, the Immediate MDT and Logged MDT should allow for the following configurations related to WLAN/BT:

Immediate MDT

UE should include any WLAN/BT in order of decreasing WLAN/BT RSSI, i.e. the best WLAN/BT is included first, in a measurement report. Round trip time could be reported optionally if WLAN measurement is available. Note this UE behavior is quite similar to when reportAnyWLAN IE is configured.

Logged MDT

UE should include available WLAN/Bluetooth measurement results in log as neighboring cells. Round trip time could be optionally included in the log if WLAN/BT measurement is available. It needs further consideration about the maximum number of WLAN/BT which includes in log at one logging occasion. If UE configured both WLAN measurement to assess indoor performance and WLAN/BT measurements to provide location information for the associated other MDT measurements, WLAN AP measurement result should not be logged as neighboring cells for avoiding the duplication as mentioned in Proposal 8.

(3. Common Solution v.s. Separate Solutions)

As previously discussed in Section 2, the UE behavior is not same between 2.1 and 2.2 due to the separate requirements between the scenarios. Therefore, we prefer to have separate solutions for "WLAN measurement to assess indoor performance" and "WLAN/BT measurements to provide location information for the associated other MDT measurements". Then, RAN2 should introduce two different WLAN/BT MDT indications "for WLAN measurement to assess indoor performance" and "for WLAN/BT measurements to provide location information for the associated other MDT measurements".

Proposal 11: Separate solutions should be introduced for Scenarios 1 and 2.

Proposal 12: Indications for the support of the two scenarios should be provided in the respective MDT mechanisms (i.e., Alt 2 for Scenario 1 and Alt 1 for Scenario 2).

The invention claimed is:

1. A user equipment of a cellular communication system comprising:
    a communicator configured to perform a radio communication by at least one of Wireless Local Area Network (WLAN) and Bluetooth;
    a cellular receiver configured to receive a configuration message which is transmitted from a network of the cellular communication system and sets a Minimization of Drive Test (MDT) measurement in which the cellular communication system is set as a measurement target;
    a controller configured to perform a radio measurement on the cellular communication system based on the configuration message; and
    a transmitter, wherein
    the controller is configured to record MDT measurement information including a measurement result for the cellular communication system,
    the controller is configured to include the measurement result for the at least one of the WLAN and the Bluetooth in the MDT measurement information when the measurement result for the at least one of the WLAN and the Bluetooth is available,
    the transmitter is configured to transmit, to the network, a first availability indicator indicating that the measurement result for the cellular communication system is included in the MDT measurement information, and
    when the measurement result for the at least one of the WLAN and the Bluetooth is included in the MDT measurement information, the transmitter is configured to transmit, to the network, a second availability indicator indicating that the measurement result for the at least one of the WLAN and the Bluetooth is further included in the MDT measurement information.

2. The user equipment according to claim 1, further comprising:
    a Global Navigation Satellite System (GNSS) receiver configured to acquire GNSS location information, wherein the controller is configured to include the measurement result for the at least one of the WLAN and the Bluetooth in the MDT measurement information when the GNSS location information is not acquirable, and the measurement result for the at least one of the WLAN and the Bluetooth is available.

3. The user equipment according to claim 1, wherein
the controller is configured to autonomously include the measurement result for the at least one of the WLAN and the Bluetooth in the MDT measurement information when the measurement result for the at least one of the WLAN and the Bluetooth is available although the configuration message does not set the at least one of the WLAN and the Bluetooth as a measurement target.

4. The user equipment according to claim 1, wherein
the cellular receiver is further configured to receive a system information block configured to be broadcasted in a cell of the network and include an identifier list,
the identifier list includes at least one of the following: one or more WLAN identifiers and one or more Bluetooth identifiers, and
the controller is configured to perform a radio measurement on the at least one of the WLAN and the Bluetooth only for identifiers in the identifier list.

5. The user equipment according to claim 1, wherein
the transmitter is further configured to transmit, to the base station, the measurement result of the WLAN including an identifier of a source transmitting a radio signal of the WLAN, an Received Signal Strength Indicator (RSSI) of the radio signal, and a Round trip time of the WLAN.

6. An apparatus controlling a user equipment of a cellular communication system, the apparatus comprising a processor and a memory, the processor configured to:

perform a radio communication by at least one of Wireless Local Area Network (WLAN) and Bluetooth;
receive a configuration message which is transmitted from a network of the cellular communication system and sets a Minimization of Drive Test (MDT) measurement in which the cellular communication system is set as a measurement target;
perform a radio measurement on the cellular communication system based on the configuration message;
record MDT measurement information including a measurement result for the cellular communication system,
include the measurement result for the at least one of the WLAN and the Bluetooth in the MDT measurement information when the measurement result for the at least one of the WLAN and the Bluetooth is available,
transmit, to the network, a first availability indicator indicating that the measurement result for the cellular communication system is included in the MDT measurement information, and
when the measurement result for the at least one of the WLAN and the Bluetooth is included in the MDT measurement information, transmit, to the network, a second availability indicator indicating that the measurement result for the at least one of the WLAN and the Bluetooth is further included in the MDT measurement information.

7. The apparatus according to claim 6, wherein
the processor is further configured to:
transmit, to a base station, the measurement result of the WLAN including an identifier of a source transmitting a radio signal of the WLAN, an Received Signal Strength Indicator (RSSI) of the radio signal, and a Round trip time of the WLAN.

* * * * *